5 Sheets—Sheet 1

A. S. PECK.

CORN HARVESTER.

No. 11,492. Reissued May 7, 1895.

Witnesses
M. E. Shields.
John M. Culver

Inventor
Albert S. Peck
By his Attorney
Joseph H. Parkinson

5 Sheets—Sheet 2.

A. S. PECK.

CORN HARVESTER.

No. 11,492. Reissued May 7, 1895.

Witnesses
M. E. Shields
John M. Culver

Inventor
Albert S. Peck
By his Attorney
Joseph G. Pattison

5 Sheets—Sheet 3.

A. S. PECK.

CORN HARVESTER.

No. 11,492. Reissued May 7, 1895.

Witnesses

M. E. Shields.

John M. Culver

Inventor

Albert S. Peck

By his Attorney

Lucien G. Parkinson

5 Sheets—Sheet 4.

A. S. PECK.

CORN HARVESTER.

No. 11,492. Reissued May 7, 1895.

Witnesses
M. E. Shields
John M. Culver

Inventor
Albert S. Peck
By his Attorney
Joseph G. Robinson

A. S. PECK.
CORN HARVESTER.
No. 11,492. Reissued May 7, 1895.
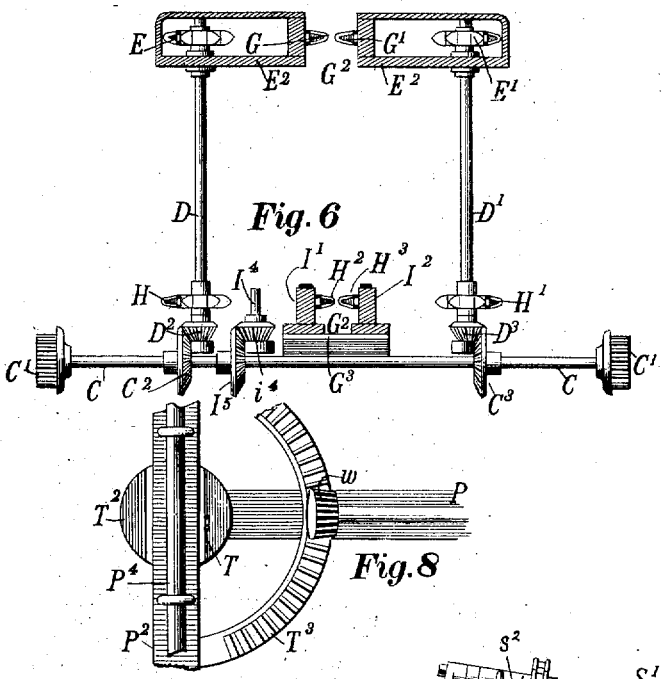
Fig. 6
Fig. 8
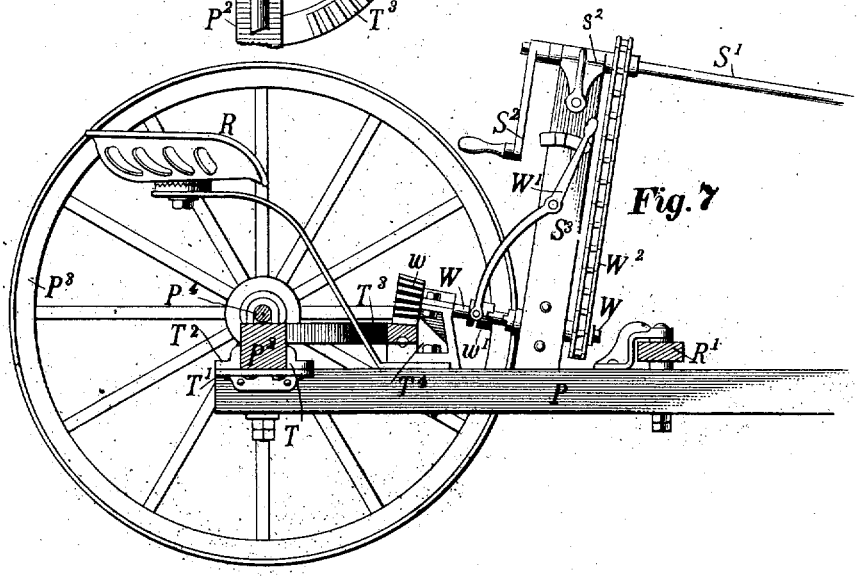
Fig. 7
Witnesses
M. C. Shields
John M. Culver
Inventor
Albert S. Peck
By his Attorney
Joseph G. Robinson

UNITED STATES PATENT OFFICE.

ALBERT S. PECK, OF GENEVA, ASSIGNOR TO THE McCORMICK HARVESTING MACHINE COMPANY, OF CHICAGO, ILLINOIS.

CORN-HARVESTER.

SPECIFICATION forming part of Reissued Letters Patent No. 11,492, dated May 7, 1895.

Original No. 466,512, dated January 5, 1892. Application for reissue filed February 25, 1893. Serial No. 463,775.

*To all whom it may concern:*

Be it known that I, ALBERT S. PECK, a citizen of the United States, residing at Geneva, in the county of Kane and State of Illinois, have invented certain new and useful Improvements in Corn-Harvesters, of which the following is a specification.

This invention relates to automatic mechanism for severing standing corn, assembling the stalks into sheaves, uniting a band around them, and discharging the bound sheaf from the side of the machine out of the way of the team in the next round; and it consists in certain novel features in the combination, arrangement, and operation of devices employed whereby the corn-stalks are cut and bound together in a standing position before the bundle is discharged from the machine, as will be hereinafter set forth in detail.

In my invention I arrange a binder, as it were, on end, in rear of the gathering arms or boards of the harvester, locate a cutter at their point of convergence, and form a vertical passage-way, open at the top and having a closed bottom or deck, leading form the knives to said binder, feeding the stalks to the binder in an upright position along this passage-way by conveyer-fingers traveling in upwardly and rearwardly inclined paths and severing the accumulated stalks, when sufficient have collected to form a bundle, by means of a horizontally vibrating needle-arm pivoted on one side of the passage-way and coacting with band uniting devices at the other side thereof; the passage-way, beyond the binder, having its rear side deflected or inclined outwardly to the side of the machine where the bound sheaves are discharged over the edge of the decking beyond the tread of the carrying-wheel on that side.

Figure 1:
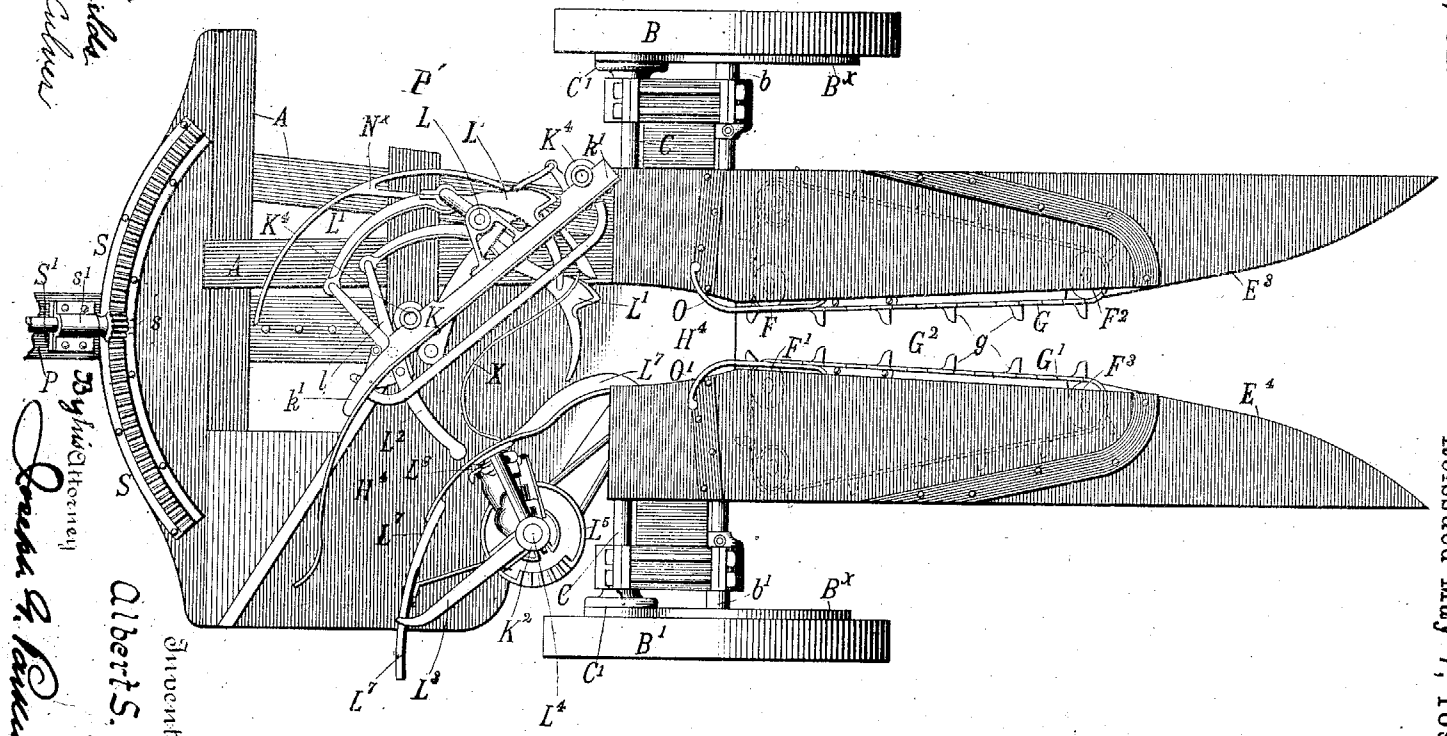
Figures 2, 5:
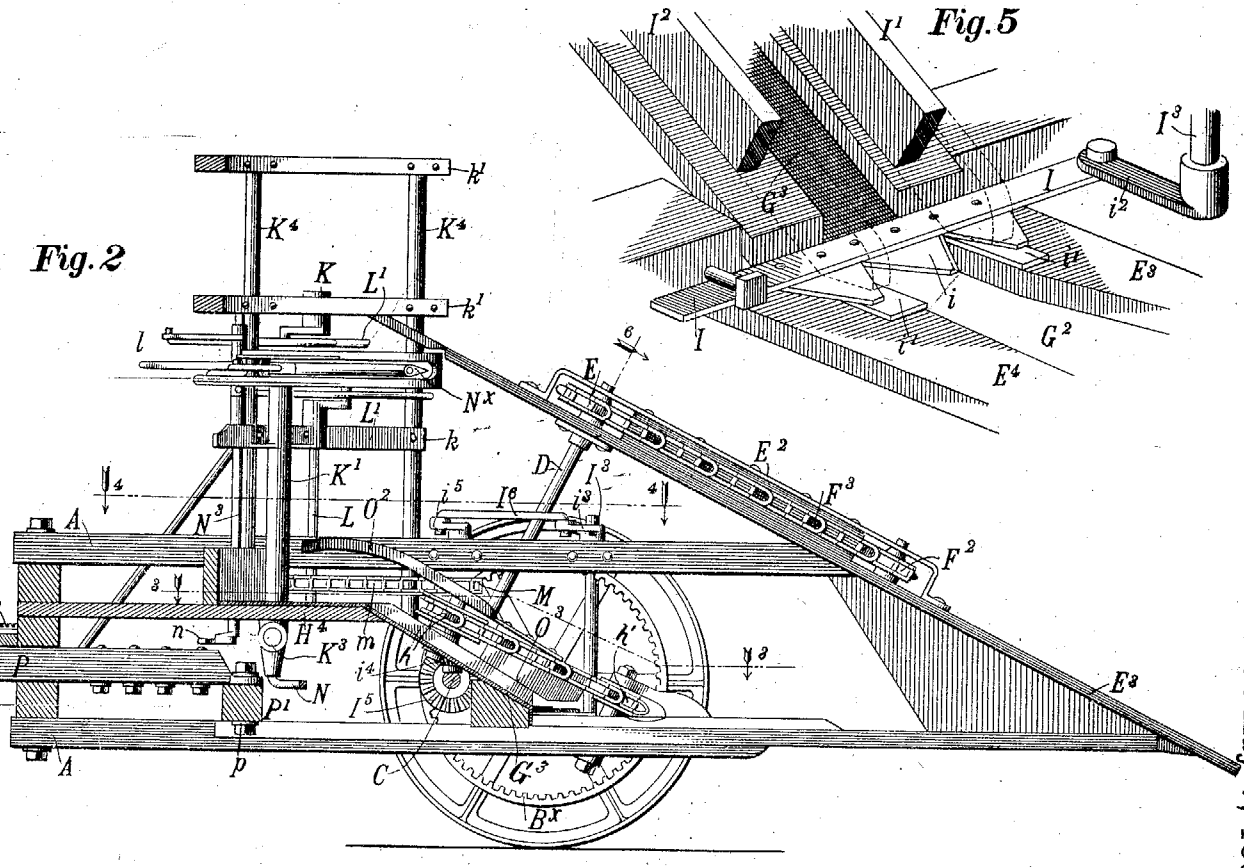
Figure 3:
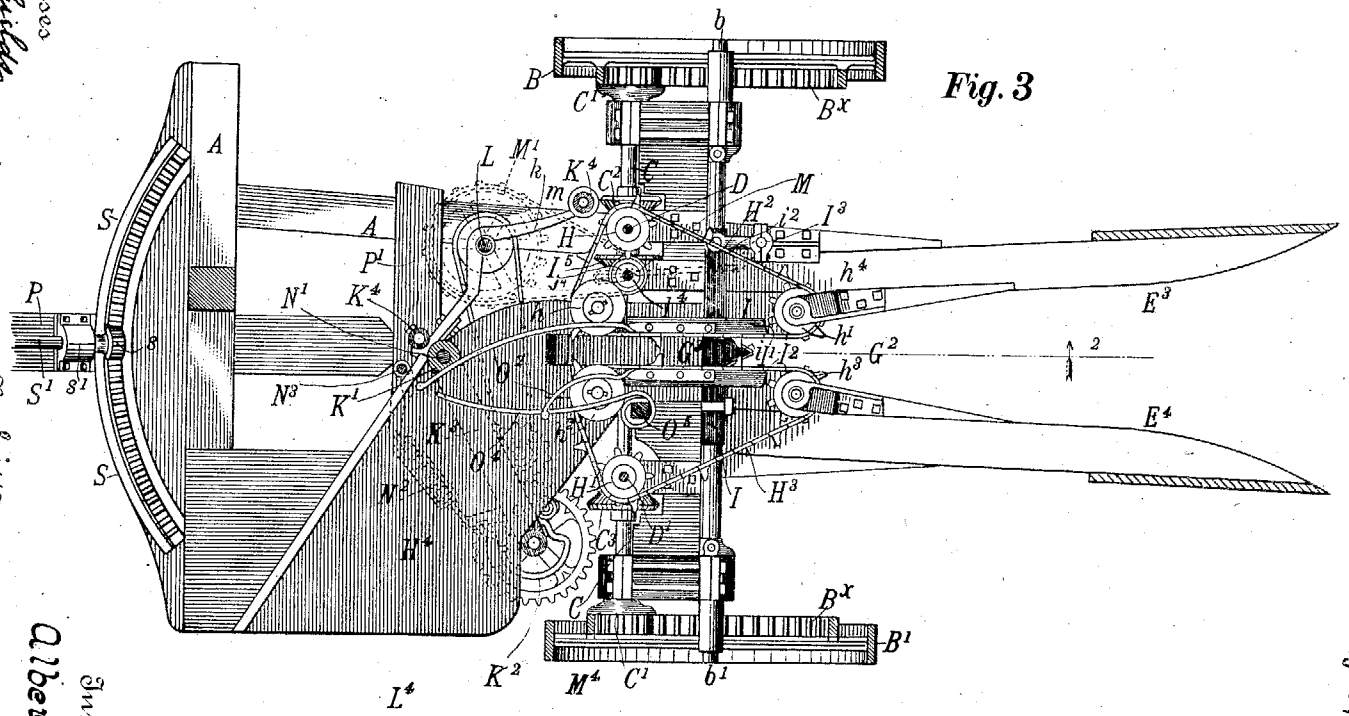
Figure 4:
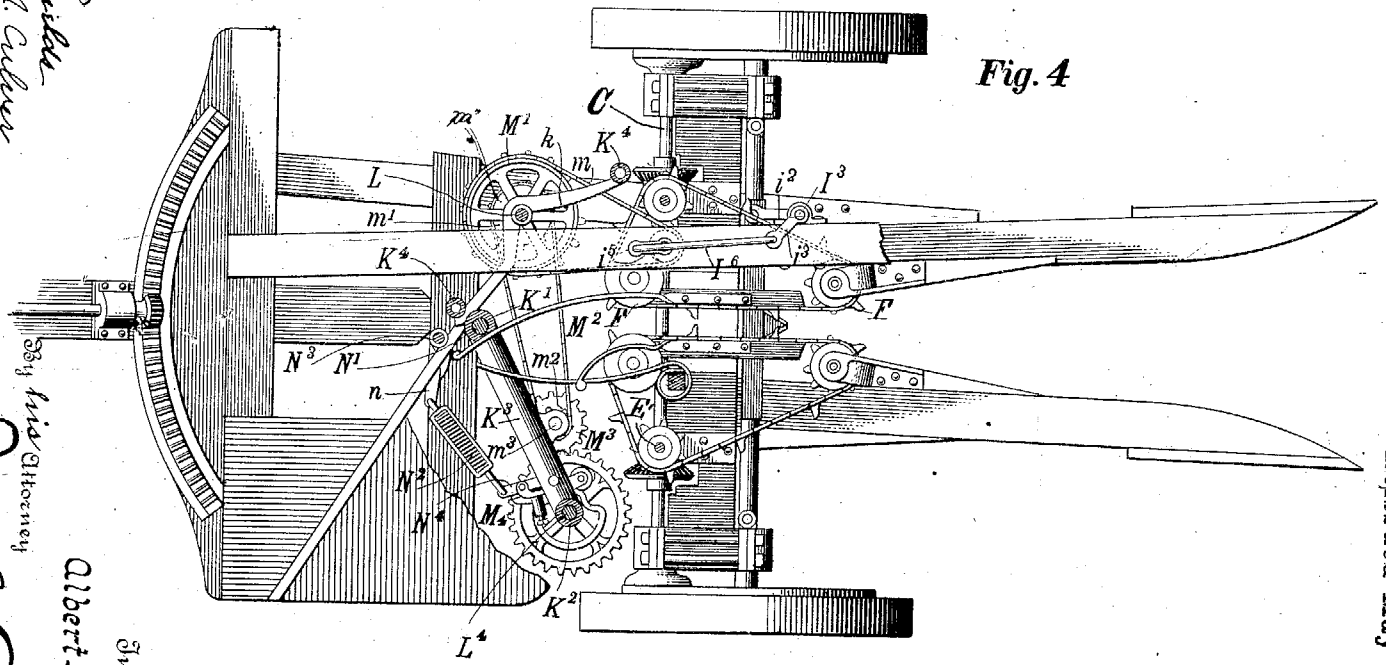

In the drawings, Figure 1 is a plan of that part of the machine in advance of the propelling power doing the cutting and binding; Fig. 2, a vertical longitudinal section in plane 2, Fig. 3, looking in the direction indicated by the arrow; Fig. 3, a horizontal section on the angular line 3, Fig. 2; Fig. 4, a like horizontal section on the correspondingly-numbered line in said second figure; Fig. 5, a broken-away detail of the cutting mechanism and adjacent parts; Fig. 6, a broken-away vertical section in detail, line 6, Fig. 2; Fig. 7, a broken-away elevation and part section of the sulky-attachment mechanism in the rear of the machine proper for controlling the operation of the same; Fig. 8, a broken-away plan of the mechanism below the driver's seat.

This machine is adapted to cut a single row of stalks, the horses being placed in the rear of and pushing the machine ahead.

A represents the different parts of the main frame supporting the machine proper.

The driving or ground wheels, B and B′, are mounted on their respective axles, *b* and *b′*, and are provided with the toothed circle or internal annular gear, $B^{\times}$, from which the different parts of the working mechanism receive their motion through the medium of the transmitting connections, to be hereinafter described.

The horizontal main driving-shafts C, running transversely of the line of advance of the machine, (see Figs. 1, 3, 4 and 5) is provided with suitable journal-bearings and has the pinions, C′, mounted on its respective ends, which engage with the internal gear, formed on the inner side of the driving-wheels. The twin bevel-pinions, $C^2$, and $C^3$, are also mounted on the main shaft.

D and D′ are inclined shafts extending upwardly and inclining forward from the main shaft. These inclined shafts have pinions, $D^2$ and $D^3$, mounted on their lower ends, which engage with pinions, $C^2$ and $C^3$ as shown in Fig. 6.

Sprocket-wheels, E and E′, are mounted on the upper ends of the two inclined shafts just inside of the rear end of the housing, $E^2$, (see Figs. 1 and 2,) located on top of the gathering-boards, $E^3$ and $E^4$, between which the stalks are carried on their way to the binding mechanism.

Sprocket-wheels, F and F′ (see Fig. 1) are journaled inside of the rear end of the housing on the respective gathering-boards and project a little beyond the edge, as shown. Sprocket-wheels, $F^2$ and $F^3$, are journaled in the front end and edge of the housing. The endless link belts, G and G′, are mounted on their respective sprocket-wheels and travel in an inclined plane, as shown in Fig. 2. These belts are armed with the conveyer-fingers, $g$, which project into the passage, $G^2$, between the dividing-boards and engage with and assist in carrying the stalks back and up the inclined table or chute, $G^3$, which extends rearwardly and upwardly behind the cutters.

Sprocket-wheels, H and H′, are mounted on the lower part of the companion inclined shafts, D and D′, as shown in Figs. 3 and 6.

A guide-sprocket, $h$, is mounted on a stub-shaft and journaled in the frame, and is located near the upper end of the inclined table. Another sprocket-wheel, $h'$, is provided with a suitable supporting-bearing, and is located in advance of the front end of the inclined table and cutter, the relative position being plainly shown in Fig. 2. On the opposite side of the inclined table and pathway of the stalks are the sprocket-wheels, $h^2$ and $h^3$, located in a corresponding position relative to sprocket-wheels, $h'$, and $h^2$. These sprocket-wheels are all set at an angle, so as to impart to the link belts, $H^2$ and $H^3$, mounted thereon, the same degree of inclination as the upper carrying belts, G and G′. The link belts, $H^2$ and $H^3$, are each armed with the conveyer-fingers, $h^4$, which project into the pathway of the stalks and engage with the same near the butt-ends, the upper carrying-belts engaging the stalks near their middle. By this arrangement the stalks are carried back and deposited on the binder-table, $H^4$, in an upright position, then bound and discharged from the machine.

The position of the cutter-bar, I, is clearly shown in Fig. 5, the upper part of the dividing-boards and the belt-carrying mechanism being omitted for the sake of clearness. The guide-rails, I′, and $I^2$, placed at each side of the inclined table to guide the butts of the stalks and prevent them from spreading or straddling, are also broken away, their continuation and relative position being indicated in dotted lines.

The cutter bar is provided with a number of the usual triangular knives, $i$, the center knife doing the cutting, in connection with the stationary or ledger blades, $i'$, having the inner edges sharpened and rigidly secured to the horizontal members of the dividing-boards on each side of the passage therebetween. The required reciprocating movement to the cutter-bar is transmitted through the medium of the arm, $i^2$, (see Fig. 5) one end of which is attached to one end of said bar, the opposite or hub end being mounted on the lower end of the vertical rock-shaft, $I^3$. This shaft is located at one side of the machine and extends up through one of the upper longitudinal framing-bars. (See Figs. 2 and 3.) On the upper projecting end of this shaft is mounted the crank-arm, $i^3$. A vertical rotating-shaft, $I^4$, extends straight up from the main horizontal driving-shaft and has the bevel-pinion, $i^4$, at its lower end, which pinion engages with pinion, $I^5$, mounted on the main shaft. These pinions are shown in Figs. 2 and 6, the shaft being broken away in the latter figure and shown in section in Fig. 3. Shaft, $I^4$, has the crank-arm, $i^5$, Fig. 2, mounted on its upper end. The link, $I^6$, connects crank-arms, $i^3$ and $i^5$, whereby a rocking movement is imparted to shaft, $I^3$, from the rotating shaft, $I^4$, and in turn a reciprocating movement is imparted to the cutter-bar. The relative positions of these parts are indicated in dotted lines, Fig. 3.

The binder mechanism shown is a well-known grain-binder placed in a vertical position and applied to this machine. By binding the stalks together in a standing position a much more uniform and perfect bundle can be made than when binding in a horizontal position as the stalks under the latter arrangement will cross each other and become tangled in falling from the cutters upon the platform.

K is the frame of the binder composed of a vertical sleeve, K′, which incloses the needle-shaft and is located, herein, on the left hand side of the passage-way for the stalks, and $K^2$ is a second vertical sleeve, located to the right hand side of said passage-way and adjacent to the carrying-wheel at that side and inclosing the tyer and ejector-shaft, the two sleeves being united by a tubular beam, $K^3$, corresponding to the standard or post of the ordinary binder-frame. Vertical frame-bars, $K^4$, are located parallel with and to either side of the needle shaft-sleeve and tied thereto by transverse bars, $k$, and also united beyond said sleeve by braces, $k'$, which support the upper outer wall of the passage.

L is a crank packer-shaft carrying packing-arms, L′, controlled by links, $l$, at their heel-ends, which work alternately across the curved or oblique passage-way, $H^4$, to receive the grain as it is delivered by the chains and carry it forward against the trip-arm, $L^2$, by which the binder is started.

$L^3$ is an ejector-finger mounted upon the tyer-shaft, $L^4$, and in the rotation of the latter sweeping the bound bundle from the machine and discharging it over the edge of the table or decking behind the tread of the carrying-wheel at that side, the passage-way for this purpose being curved in an arc generally concentric with the hub of this carrying-wheel, or more nearly concentric with the axis of the tyer-shaft.

$L^5$, is the tyer-cam and $L^6$ the tyer separated from the passage-way by the curved shield or breast-plate, $L^7$, which forms the vertical inner wall for the passage.

A sprocket-wheel, M, is mounted on the vertical rotating shaft $I^4$ (see Fig. 3) at the point just above where it is broken away in Fig. 6. A link-belt, $m$, connects this sprocket-wheel with the sprocket-wheel, M′, mounted on the lower end of the main or packer-shaft of the binding mechanism. A smaller sprocket-wheel, $m'$, on shaft L is connected by chain, $M^2$, with a sprocket-pinion, $m^2$, on a stub-axle, $m^3$, on the main beam of the binder-frame and this pinion turns a trip-pinion, $M^3$, which engages with the main gear-and-cam-wheel, $M^4$, upon the tyer-shaft. A crank, N, on the needle-shaft, N′, is actuated in the usual way from the gear-and-cam-wheel, to vibrate the needle $N^\times$ whenever the wheel makes a revolution.

$N^2$ represents the usual yielding link connecting a crank-arm, $n$, on the trip-shaft, $N^3$, with tripping and resetting devices, $N^4$, operating in connection with the gear-and-cam-wheel to engage and disengage the trip-pinion from its sprocket-wheel and to open the trip-arm for the passage of the bound bundle and reset it to receive the next.

Spring arms, O, O′, Fig. 1, are secured at their front ends to the upper part of the gathering-boards, and extend back on each side of the passage between, and end over, the top of said boards. Below, Figs. 2 and 3, are the companion arms, $O^2$, the corresponding front ends of which are secured to the guide-rails, $O^3$, the opposite ends terminating loosely just above the binder-table. These arms serve to keep the stalks together after they pass the carrying-belts on their way to the binder mechanism. The spring-arm, $O^4$, is secured at one end to the post, $O^5$, Fig. 3, and extends loosely across the binder-table in the pathway of the stalks and assists in compressing and packing the stalks together during the operation of binding.

The inclined table and cutting mechanism are omitted from Fig. 1 for the reason that these features could not be clearly shown in this figure.

The mechanism employed in guiding and controlling the movements of the machine will now be described. The sulky attachment is placed at some distance back of the machine and is connected thereto by means of the tongue or draft-pole P. The front end of this tongue is secured to the cross-bar, P′, Figs. 1, 2 and 3, of the main frame by the bolt, $p$, and the rear end to the under side of cross-bar, $P^2$, Fig. 7, of the sulky-frame. The sulky-wheels, $P^3$, (but one is shown,) are mounted on the axle, $P^4$, and track with the wheels of the machine proper.

R is the driver's seat, and R′ the double-tree.

On the rear end of the machine is mounted the segment-rack, S. (Shown in Figs. 1, 2 and 3.)

S′ is an inclined shaft, on the front end of which is mounted the pinion, $s$, which engages with said rack. This hand-shaft is also provided at this point with journal-bearing, $s'$, fastened to the tongue. This shaft extends backwardly, Fig. 7, to a point convenient to and within reach of the driver. Hand-crank, $S^2$, mounted on the rear end of this shaft, provides means for the rotation of the same. The rear end of this shaft, S′, is provided with the bearing, $s^3$, secured to the upper end of the standard, $S^3$. By rotating this shaft the machine is swung to either side and guided as circumstances may require. The tongue connection with the sulky attachment is in the form of a fifth-wheel, T, Figs. 7 and 8, consisting of the lower plate, T′, attached to the pole, and the upper plate, $T^2$, attached to the under side of the cross-bar, $P^2$.

The sulky-axle is rigidly secured to the upper side of the bar, $P^2$, as shown in Fig. 8. A segment-rack, $T^3$, is placed just in advance of the sulky-axle and has its respective ends rigidly secured to the cross-bar. This rack is supported at its central part by the bracket-bearing, $T^4$, set on top of the tongue at that point. The rear end of the clutch-shaft, W, is journaled in said bracket and has pinion, $w$, mounted thereon, which is adapted to engage with segment-rack, $T^3$. The front part of the clutch-shaft is journaled in the lower end of standard, $S^3$, the two members forming the clutch-shaft being connected and disconnected by the usual sliding collar, $w'$, operated by means of the hand-lever, W′. Motion is transmitted to the clutch-shaft from the hand-shaft by the link-belt, $W^2$, running over sprocket-wheels mounted on said hand-shaft and the clutch-shaft. This arrangement enables the driver to make a shorter turn and handle the machine with greater facility than can be done with the steering connection on the machine proper alone, as by this construction the steering mechanism on the sulky can be used with that on the machine proper or be thrown out of action, as desired.

By having the horse placed in the rear, so as to push the machine ahead, the labor and time are saved of first having to cut a number of rows by hand in order to get room to start in. The driver always has a clear and unobstructed view. All of the working mechanism being ahead, it is much easier handled and controlled than under the ordinary arrangement.

In operation the main or carrying-wheels travel in the furrows between the corn-rows, and the gathering-arms, passing each side of the row to be cut, direct the stalks between the chains which grasp them and carry them, still standing, past the cutters, up the inclined chute or decking and between the spring-arms lining the passage-way and deliver them into the laterally confined passage-way which intervenes between their discharge from the upper conveyer-fingers and their engagement by the packers. There they are received by the packers and forced rearwardly along the oblique passage against the cord X, stretched between the knotter-head and the point of the needle, and, pressing the cord back as they are forced onward, they gradually accumulate against the trip-arm which, yielding before them, finally starts the binding mechanism. The needle then advancing and moving horizontally across the passage-way cuts off the bundle from the incoming stalks, encircles it with the cord, the knotter acts to unite the band, and the ejector, swinging around, forces the bundle laterally and still in its standing position to the side of the machine and discharges it upon the ground in the furrow which will be untraveled in the next round of the machine, and over toward the stubble of the last row cut and bound.

I claim—.

1. A corn harvester adapted to gather, deliver and bind each row independently, having in combination the gathering arms, the cutter, the laterally closed passage-way extending directly behind said gathering arms to the receiving chamber whereby the row of stalks embraced by said gathering arms is separately transmitted in upright position to said receiving chamber and thence to the binding mechanism and maintained under continuous lateral confinement until bound thereby, the conveyers traveling longitudinally of said passage-way, the laterally confined receiving chamber in the rear of the path of said conveyer fingers extending within the sweep of the packers, the packers engaging with the stalks while thus laterally confined and forming them into bundles, and the binding arm of an automatic binder sweeping in substantially a horizontal plane across the receptacle in which the bundle is thus formed, encircling and binding the same, for the purposes set forth.

2. A corn harvester adapted to gather, deliver and bind each row independently, having in combination, the forwardly projecting gathering arms suitable for embracing the row and sustaining its stalks upright while directing them to the cutter and thence rearward, the cutter, the stalk passage-way open at the top and closed at the bottom, extending rearward from said gathering arms and forming with the receiving chamber a continuous conduit in which the row thus embraced is separately conveyed in vertical position and while under uninterrupted lateral confinement to automatic binding mechanism acting in substantially a horizontal path, rearwardly actuating conveyers operating along said passage-way, the receiving chamber in the rear of said conveyers substantially continuous with said passage-way in which the stalks are thus delivered and confined laterally, the packers engaging the stalks while thus confined in said receiving chamber and forming them into bundles, the binding arm of an automatic binder sweeping in a substantially horizontal path around the bundle thus formed, and the laterally deflected passage-way behind the binding mechanism with the ejector whereby the bundle is delivered rearwardly and outwardly, for the purposes set forth.

3. A corn-harvester adapted to gather, deliver and bind each row independently having in combination with a pair of forwardly projecting gathering arms converging toward each other rearwardly and sloping upward and backward to a laterally confined passage-way adapted to sustain the stalks in substantially upright position, a cutting-knife crosswise of the passage-way included between said gathering arms, a series of conveyer-fingers driven rearward in upwardly inclined paths on each side of the space embraced by said gathering arms to substantially the level of the binding-arm, packing teeth, driven in substantially a horizontal plane, sweeping across the rear of said confined passage-way behind the delivery end of said conveyer-fingers and adapted to engage with the stalks while still confined laterally and supported vertically and positively advance them against a compressor extending across said passage-way, a laterally confined space adapted to support the stalks in upright position intermediate between the path of said conveyer-fingers and the path of the binder-arm, a table beneath and substantially parallel with the path of said packers adapted to sustain the stalks endwise, a binding-arm sweeping above and substantially parallel with the surface of said table at or near the level of the delivery end of said conveyer-fingers, tying mechanism operated in conjunction with said binding-arm, and means for automatically actuating said conveyer-fingers, packers, binding-arm and tying mechanism, for the purposes set forth.

4. In a corn-harvester adapted to gather, deliver and bind each row independently the combination of the forwardly projecting gathering arms converging toward each other and sloping upward in a rearward direction, a series of inwardly projecting conveyer-fingers traveling on each side of the passage-way between said gathering arms from points in front of and above the cutting knife to substantially the level of the binding-arm, lower conveyer-fingers traveling in approximately parallel planes to those above from points near the cutting-knife to points in the rear of the upper conveyer-fingers, a passage-way in the rear open vertically and adapted to confine the stalks laterally substantially at the level of the binding-arm, a rearwardly and upwardly inclined table below said lower conveyer-fingers extending behind the cutting-knife, a substantially horizontal table in the rear of said inclined table, an automatic binding machine mounted and driven in such relation thereto that its packing fingers sweep the passage-way behind the upper conveyer-fingers in a path substantially horizontal so as to engage with the stalks while confined in upright position and advance them, said binding machine having a compressor arm extending across said passage-way in the rear of said packing fingers, a binding-arm moving in substantially a horizontal plane entering the space cleared by the packers and encircling the upright stalks while thus confined and tying mechanism operated in conjunction therewith, and means for automatically actuating said conveying, packing, binding and tying mechanism in correspondence with each other, for the purposes set forth.

5. In a corn-harvester adapted to gather, deliver and bind each row independently the combination of a pair of forwardly projecting gathering arms converging toward each other rearwardly from their forward ends and sloping upward and backward from approximately the cutting plane to approximately the plane of the binding-arm, a series of inwardly projecting conveyer-fingers traveling along the inner faces of said gathering arms in backwardly inclined paths from points above the level of and in front of the cutting-knife to substantially the level of the binding-arm, a series of inwardly projecting conveyer-fingers traveling below and in approximately parallel planes with the first mentioned conveyers from points behind the forward end of the path of the first mentioned conveyers to points farther rearward than the said path, a passage-way in the rear of said conveyers open vertically above but confined laterally near the plane of the binding-arm, a binding-arm sweeping across said passage-way in substantially a horizontal path in the rear of said upper conveyer-fingers and with a space intervening between the path of said fingers and said binding-arm adapted to retain the incoming stalks in vertical position while those in advance are being compressed and bound, a compressor extending across said passage-way in rear of said binding-arm, tying mechanism operating in conjunction with said binding-arm, and means for automatically actuating said conveying, binding and tying mechanism from the power furnished by the draft of the machine, for the purposes set forth.

6. In a corn-harvester adapted to gather, deliver and bind each row independently the combination of gathering arms in advance of the cutting-knife, a series of inwardly projecting conveyer-fingers traveling rearwardly in an upwardly inclined path from points between said gathering arms and in advance of the cutting-knife to points in the rear of said knife and at substantially the level of the binding-arm, a series of conveyer-fingers traveling below the first mentioned fingers in substantially parallel planes and adapted to engage and disengage, respectively, with the stalks in the rear of the points at which the first mentioned conveyer-fingers engage and disengage, a laterally confined rearward passage-way for the vertically supported stalks into which they are forced in substantially upright position by said conveyers, a floor extending under said lower conveyers sloping upward and rearward behind the cutting-knife, a substantially horizontal floor behind said sloping floor adapted to sustain the stalks endwise and to even their butts after they are discharged from the conveyer-fingers, an automatic binder whose binding-arm is driven rearwardly in substantially a horizontal path across the passage-way into which said conveyer-fingers discharge and having a compressor in the rear of said binding-arm against which the stalks are compressed and bound and tying mechanism operated in conjunction with said binding-arm, a laterally deflected passage-way behind said compressor adapted to deliver the bound bundles to one side of the path embraced by the gathering arms, a discharge arm operated to eject the bundle in said lateral course, and mechanism actuating said conveying, binding, tying and ejecting devices from a common source, for the purposes set forth.

7. In a corn-harvester and binder, the combination, with the gathering-arms, $E^3$ and $E^4$, the inclined flooring, $G^3$, the horizontal binder-table, and the vertically arranged binder of the main driving-shaft, the inclined shafts, D and D′, geared therewith, sprocket-wheels on the upper ends thereof, and the endless link-belt, G, G′, running forward of and adapted to be actuated by said sprocket-wheels, of the auxiliary sprocket-wheels, H, H′, mounted on the inclined shafts, D, and D′, just above the inclined flooring, and adapted to actuate the short auxiliary link-belts, $H^2$ and $H^3$, having their rear ends extending in rear of the link-belts, G, G′, substantially as described.

8. In a corn-harvester, the combination, with the gathering-boards, and the inclined table-rails, of the spring-arms, O, O′, the companion arms, $O^2$, $O^3$, and the arm, $O^4$, substantially as described.

9. In a corn-harvester, the combination of the machine, the sulky located in rear thereof, a tongue having vertical pivotal connections at its opposite ends with the frame and the sulky, gear-racks mounted on the frame and sulky between the connections of the tongue therewith, gear-wheels carried by the tongue and engaging the said racks, and a single operating device for actuating either the front gear-wheel or both, as desired, substantially as described.

10. In a corn-harvester, the combination of the machine, the sulky located in rear thereof, a tongue having vertical pivotal connections at its opposite ends with the frame and the sulky, gear-racks mounted on the frame and sulky, between the connections of the tongue therewith, a shaft carried by the tongue, a gear-wheel fixed on the shaft engaging the rack on the machine, and a loose gear-wheel engaging the rack on the sulky and adapted to be locked to the shaft, substantially as described.

11. In a corn-harvester, the combination, with the machine proper, the tongue, P, pivoted thereto, the segment-rack, S, on said machine, the pinion, *s*, engaging said rack, the shaft, S′, carrying said pinion, and the hand-wheel for operating said shaft, of the sulky located in rear of the machine and pivotally connected with the tongue, the segment-rack, T′, on said sulky, pinions, *w*, clutch-shaft, W, lever, W′, controlling the clutch, and a sprocket-connection between the shafts, S′ and W′, substantially as described.

ALBERT S. PECK.

Witnesses:
JOHN M. CULVER,
JOHN V. A. HASBROOK.